(12) United States Patent
Kim et al.

(10) Patent No.: US 10,040,533 B2
(45) Date of Patent: Aug. 7, 2018

(54) BALLAST WATER TREATMENT APPARATUS AND METHOD FOR SHIP USING FORWARD OSMOSIS PROCESS

(71) Applicant: DOOSAN HEAVY INDUSTRIES & CONSTRUCTION CO., LTD., Changwon-si (KR)

(72) Inventors: Sung Hoon Kim, Anyang-si (KR); Won Joon Choi, Yongin-si (KR); Choa Mun Yun, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 409 days.

(21) Appl. No.: 14/740,401

(22) Filed: Jun. 16, 2015

(65) Prior Publication Data

US 2016/0046360 A1 Feb. 18, 2016

(30) Foreign Application Priority Data

Aug. 13, 2014 (KR) .................. 10-2014-0104976

(51) Int. Cl.
*B01D 61/58* (2006.01)
*C02F 1/44* (2006.01)
(Continued)

(52) U.S. Cl.
CPC .......... *B63J 4/002* (2013.01); *B01D 61/002* (2013.01); *B01D 61/005* (2013.01); *C02F 1/445* (2013.01);
(Continued)

(58) Field of Classification Search
CPC ...... B63J 4/002; B01D 61/005; B01D 61/002; B01D 2313/36; B01D 2311/04;
(Continued)

(56) References Cited

U.S. PATENT DOCUMENTS

2009/0001020 A1* 1/2009 Constantz ............ B01D 61/025
210/652
2011/0108483 A1* 5/2011 Kaas ................... C04B 38/0003
210/650

(Continued)

FOREIGN PATENT DOCUMENTS

CN 202849126 U 4/2013
EP 2 939 729 A1 11/2015
(Continued)

OTHER PUBLICATIONS

Communication dated Apr. 7, 2016 from the European Patent Office in counterpart Application No. 15178173.9.

*Primary Examiner* — Pamela H Weiss
(74) *Attorney, Agent, or Firm* — Sughrue Mion, PLLC (57) ABSTRACT

A ballast water treatment apparatus for a ship includes a water collection part for collecting sea water, a forward osmosis process unit for producing ballast water and treatment water obtained by desalinating the sea water collected through the water collection part, and a ballast water tank for storing the ballast water produced by the forward osmosis process unit. Since the sea water is treated using a forward osmosis process, fresh water required within the ship can be supplied and the treated sea water can be used as ballast water. In addition, since waste heat and carbon dioxide generated in the ship are used to treat the sea water, the ballast water can be treated and produced in a low-cost and high efficient manner.

12 Claims, 5 Drawing Sheets

(51) Int. Cl.
    *B63J 1/00*     (2006.01)
    *B63J 4/00*     (2006.01)
    *B01D 61/00*     (2006.01)
    *C02F 1/00*     (2006.01)
    *C02F 103/00*     (2006.01)

(52) U.S. Cl.
    CPC .. *B01D 2311/04* (2013.01); *B01D 2311/2649* (2013.01); *B01D 2313/26* (2013.01); *B01D 2313/36* (2013.01); *B01D 2315/06* (2013.01); *C02F 1/001* (2013.01); *C02F 2103/008* (2013.01); *Y02A 20/131* (2018.01)

(58) Field of Classification Search
    CPC ........ B01D 2311/2649; B01D 2313/26; B01D 2315/06; C02F 1/445; C02F 2103/008; C02F 1/001
    See application file for complete search history.

(56) References Cited

U.S. PATENT DOCUMENTS

2012/0012511 A1*   1/2012   Kim ................... B01D 61/002
                                                                             210/170.11
2015/0353384 A1*  12/2015   Yun ................... B01D 61/002
                                                                             210/192

FOREIGN PATENT DOCUMENTS

| JP | 2005-329300 A | 12/2005 |
| JP | 2014008469 A | 1/2014 |
| KR | 101220261 B1 | 2/2013 |
| KR | 101352521 B1 | 1/2014 |
| KR | 20140018848 A | 2/2014 |

\* cited by examiner

BALLAST WATER TREATMENT APPARATUS AND METHOD FOR SHIP USING FORWARD OSMOSIS PROCESS

CROSS-REFERENCE(S) TO RELATED APPLICATIONS

This application claims priority to Korean Patent Application No. 10-2014-0104976, filed on Aug. 13, 2014, the disclosure of which is incorporated herein by reference in its entirety.

BACKGROUND

Field

Exemplary embodiments of the present invention relate to a ballast water treatment apparatus and method for a ship using a forward osmosis process, and more particularly, to a ballast water treatment apparatus and method for a ship using a forward osmosis process, capable of treating and producing ballast water in a ship using a forward osmosis process so as to supply eco-friendly ballast water to the ship in a low-cost and high efficient manner.

Description of the Related Art

Ballast water in a ship is sea water filled within the ship, and serves to improve safety of the ship by lowering a center of gravity of the ship or adjusting horizontal balance of the ship according to a cargo amount. In addition, the ballast water lowers the center of gravity of the ship to prevent propulsion from decreasing due to rising of a propeller near to a water surface when the center of gravity of the ship becomes high and to prevent fatigue failure caused by impact with the water surface when the propeller is rotated, thereby enabling the ship to be effectively operated.

The ballast water in the ship is an essential condition in navigation. However, sea water collected from a loading place of cargoes is used as the ballast water and the used ballast water is discharged to an unloading place of cargoes, thereby allowing marine organisms to be artificially moved. For this reason, there is a problem in that a marine ecosystem is disturbed and destroyed. In addition, the ballast water is one of the causes of marine pollution. Accordingly, in order to resolve these problems, "a Ballast Water Management Act (2004)" is internationally adopted and a ballast water treatment system will be defined to be obligatorily installed in ships from all over the world from 2017.

As disclosed in Korean Patent Publication No. 10-1204879, ballast water in a ship is conventionally treated by a chemical treatment method of injecting a sterilization component such as ozone or chlorine into collected sea water, a method of electrically treating collected sea water, a physical treatment method of simply filtering collected sea water, or the like. However, since the treated ballast water is exposed to chemicals in such a conventional ballast water treatment method, a marine ecosystem is contaminated when the ballast water is discharged after being used. In addition, a method of having little influence on the marine ecosystem is costly. Therefore, it is necessary to develop an eco-friendly ballast water treatment system for a ship, capable of treating and supplying ballast water in a ship in a low-cost and high efficient manner and having little influence on a marine ecosystem.

RELATED ART DOCUMENT

[Patent Document] Korean Patent Publication No. 10-1204879 (Nov. 20, 2012)

SUMMARY

An object of the present invention is to provide a ballast water treatment apparatus and method for a ship using a forward osmosis process, capable of treating and producing ballast water in a ship using a forward osmosis process so as to supply eco-friendly ballast water to the ship in a low-cost and high efficient manner.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a ballast water treatment apparatus for a ship using a forward osmosis process includes a water collection part for collecting sea water, a forward osmosis process unit for producing ballast water and treatment water obtained by desalinating the sea water collected through the water collection part, and a ballast water tank for storing the ballast water produced by the forward osmosis process unit.

The forward osmosis process unit may further include a pre-treatment part for pre-treating the collected sea water.

The forward osmosis process unit may further include a forward osmosis membrane module which produces a mixture solution by infiltrating fresh water into a draw solution from the pre-treated sea water and supplies a portion of the produced mixture solution to the ballast water tank, a recovery module which recovers the draw solution and separates the desalinated treatment water from the mixture solution, a draw solution tank which stores the draw solution, and a treatment water tank which stores the treatment water.

The recovery module may recover the draw solution using heat supplied from an economizer for absorbing waste heat of combustion gas discharged from an engine of a ship after combustion so as to supply the draw solution to the draw solution tank, and the separated treatment water may be supplied to the treatment water tank.

The recovery module may further include a carbon dioxide absorber which absorbs carbon dioxide of the combustion gas into the recovered draw solution so that the draw solution absorbing the carbon dioxide is recovered to the draw solution tank.

The recovery module may include a carbon dioxide separator which separates carbon dioxide by absorbing waste heat of combustion gas discharged from an engine of a ship after combustion, a liquid phase separator which separates the draw solution using the separated carbon dioxide, and a separation membrane which separates the treatment water from the liquid phase separator.

The recovery module may further include a carbon dioxide contactor which allows the draw solution separated from the liquid phase separator to come into contact with carbon dioxide of the combustion gas so that the draw solution coming into contact with the carbon dioxide is supplied to the draw solution tank.

The recovery module may include a separation membrane which separates the draw solution and the treatment water from the mixture solution by surplus power supplied from a ship.

The recovery module may include a magnetic separator which separates the draw solution and the treatment water from the mixture solution by surplus power supplied from a ship.

The recovery module may include a cooler operated by surplus power supplied from a ship, a precipitation tank for precipitating the draw solution by lowering a temperature of the draw solution through the cooler and supplying the crystallized draw solution to the draw solution tank, and a separation membrane which separates the treatment water from the precipitation tank by the supplied surplus power.

The recovery module may further include a first heat exchanger which heats and dissolves the crystallized draw solution supplied to the draw solution tank using heat supplied from an economizer for absorbing waste heat of combustion gas discharged from an engine of the ship after combustion.

The recovery module may further include a second heat exchanger which heats the pre-treated sea water supplied to the forward osmosis membrane module using the heat supplied from the economizer.

The ballast water treatment apparatus may further include a filter part for filtering the sea water collected through the water collection part, and a sea water pump for pumping the sea water such that the sea water is collected through the water collection part and supplying the sea water filtered by the filter part to the pre-treatment part.

The draw solution may be a material belonging to one of a volatile material group, an inorganic material group, an organic material group, and a synthesis material group.

In accordance with another aspect of the present invention, a ballast water treatment method for a ship includes introducing sea water collected through a water collection part by a sea water pump into a forward osmosis membrane module of a forward osmosis process unit, producing a mixture solution by mixing a draw solution with fresh water of the sea water, and separating desalinated treatment water from the mixture solution by a recovery module to supply the separated treatment water to a treatment water tank.

The ballast water treatment method may further include performing a pre-treatment process before the sea water is introduced into the forward osmosis membrane module.

The ballast water treatment method may further include separating the draw solution from the mixture solution by the recovery module to supply the separated draw solution to a draw solution tank.

Waste heat of a ship may be used when the draw solution is separated by the recovery module.

Carbon dioxide of combustion gas discharged from an engine of a ship after combustion may be used when the draw solution is separated by the recovery module.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A ballast water treatment apparatus and method for a ship using a forward osmosis process according to exemplary embodiments of the present invention will be described below in more detail with reference to the accompanying drawings (herein, since a detailed configuration and function of the forward osmosis process are apparent to those skilled in the art, detailed description thereof will be omitted). The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Figure 1:
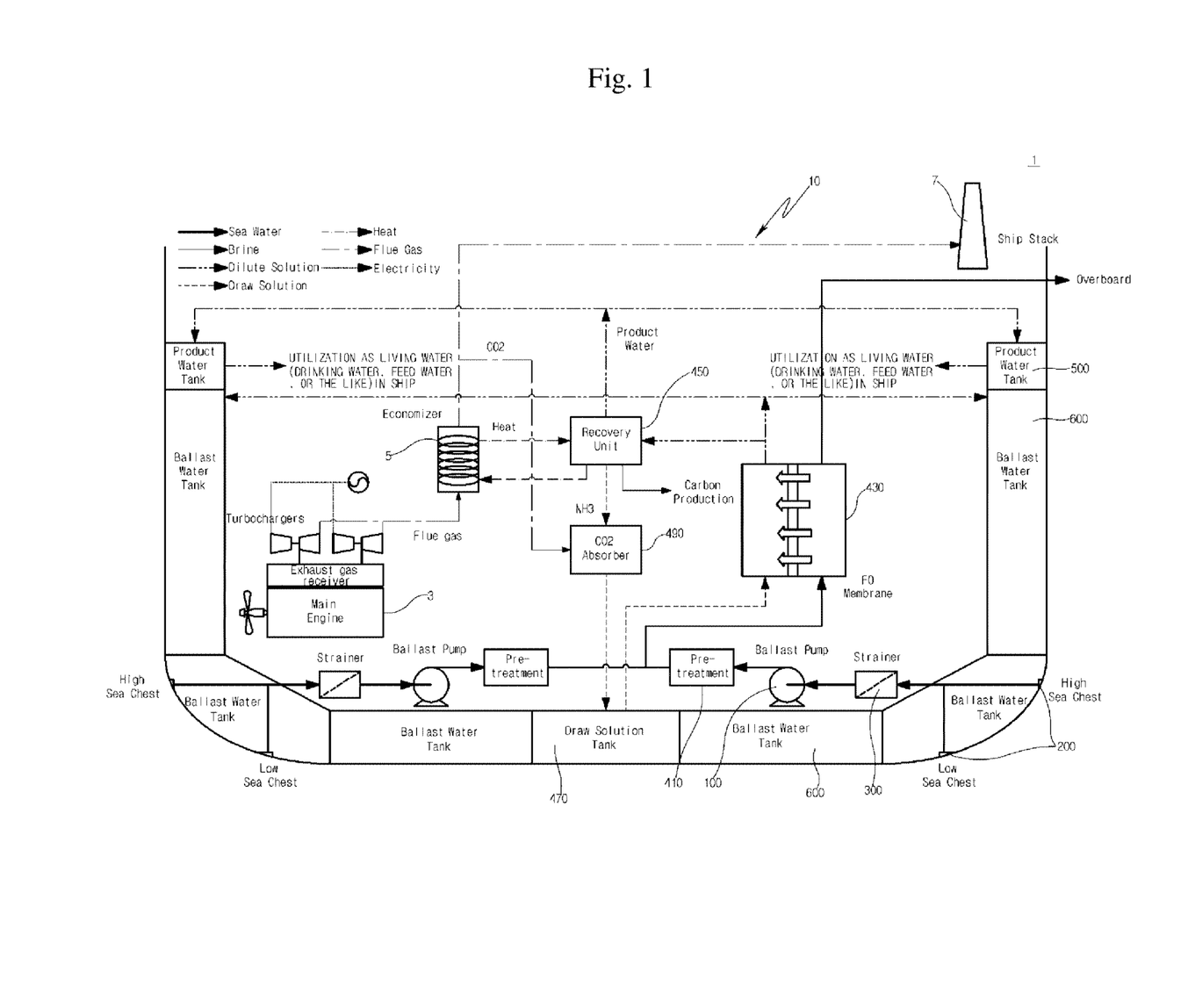
FIG. 1 is a block diagram illustrating a ballast water treatment apparatus for a ship using a forward osmosis process according to a first embodiment of the present invention.

FIG. 1 is a block diagram illustrating a ballast water treatment apparatus for a ship using a forward osmosis process according to a first embodiment of the present invention.

As shown in FIG. 1, a ballast water treatment apparatus 10 for a ship using a forward osmosis process according to a first embodiment of the present invention includes a sea water pump 100 and a water collection part 200 for collecting sea water, a filter part 300 for filtering the collected sea water once, a forward osmosis process unit 400 for producing fresh water and ballast water by treating the filtered sea water, and a treatment water tank 500 and a ballast water tank 600 for respectively storing the produced fresh water and ballast water. Here, the ballast water treatment apparatus 10 may further include a carbon dioxide absorber 490 for treating carbon dioxide generated in a ship 1.

The sea water pump 100, the water collection part 200, and the filter part 300 are provided in the ship 1 for collection of existing ballast water. Since a method of collecting sea water by the sea water pump 100 is a typical method which involves power consumption but is widely used, the method may be immediately applied to the ship 1 to help in reducing cost. In addition, various methods, for example, a method of providing a dilute solution obtained by directly submerging a filtering membrane into sea water as ballast water, and a method of variably moving a diaphragm according to an amount of product water and dilute solution obtained by a membrane in one ballast water tank so as to adjust the amount of the dilute solution may be applied to the ship 1.

The forward osmosis process unit 400 includes a pre-treatment part 410 which pre-treats the filtered sea water, a forward osmosis membrane module 430 which infiltrates fresh water into a draw solution from sea water through contact between the pre-treated sea water and the draw solution by a membrane interposed therebetween so as to produce a mixture solution, a recovery module 450 which recovers the draw solution and separates the fresh water from the mixture solution of the draw solution and the fresh water, and a draw solution tank 470 which stores the draw solution used in the forward osmosis membrane module 430. The fresh water is separated from the sea water through membrane exchange with the draw solution to be introduced into the draw solution in the forward osmosis process unit 400, and the fresh water (treatment water) introduced into the draw solution is separated from the draw solution to be utilized as living water, drinking water, or the like required within the ship 1. In addition, a portion of the treatment water may be supplied to the ballast water tank 600 to be used as ballast water in the ship 1, and the draw solution used for separation of the fresh water may be reutilized or supplied to the ballast water tank 600 to be used as ballast water in the ship 1.

The forward osmosis process generally does not require a pre-treatment process, but the pre-treatment part 410 may be selectively provided to more effectively treat sea water collected to the ship 1 and supply the treated sea water to the forward osmosis process unit 400.

The forward osmosis membrane module 430 separates fresh water from sea water using a draw solution. A portion of the draw solution used in the forward osmosis membrane module 430 is supplied as ballast water, and the remainder is introduced into the recovery module 450 so that fresh water is separated from the introduced draw solution. Various materials belonging to a volatile material group, an inorganic material group, an organic material group, and a synthesis material group may be used as the draw solution. The volatile material group may consist of ammonium bicarbonate, ammonium carbonate, etc., and the inorganic material group may consist of calcium nitrate, potassium chloride, sodium sulfate, etc. The organic material group may consist of magnesium acetate, sodium propionate, etc., and the synthesis material group may consist of sodium hexa phosphazene, etc.

The draw solution should be selected by preferentially considering safety of the ship 1 and influence on a marine ecosystem and fully reviewing inflammability and harmfulness. The draw solution having a high concentration serves to prevent proliferation of microorganisms in the fresh water absorbed into the draw solution. In addition, when a material having a higher molecular weight than water is selected and used as ballast water, the same effect may be exhibited by a smaller amount compared to a case in which sea water is used as ballast water. Consequently, it may be possible to reduce capital expenditures and operating expenditures of the ship 1.

A thermal method, a phase separation method, a membrane utilization method, a magnetic utilization method, a crystallization method, etc. may be used as a method of extracting fresh water from a draw solution and recovering the draw solution in the recovery module 450. The thermal method is a method of recovering a draw solution having high volatility and a low boiling point using a difference between boiling points at intermediate and low temperatures. In the thermal method, waste heat of a stack 7 or heat exchanger of the ship 1 may be used, and carbon dioxide required when the draw solution is recovered may be supplied from the stack 7 of the ship 1. The phase separation method is a method of using a principle in which a draw solution is phase-separated when absorbing carbon dioxide at a certain temperature for each characteristic of the draw solution. The phase separation method may be easily applied since waste heat or carbon dioxide is supplied from the stack 7 or heat exchanger of the ship 1. The membrane utilization method is a method of recovering a draw solution using a membrane such as an NF (Nano Filtration) membrane or an RO (Reverse Osmosis) membrane and may use surplus power of the ship 1. In addition, when a solution capable of reacting to a magnetic field is used together with formation of an osmotic pressure, a draw solution may be separated using the magnetic utilization method. In a draw solution which is well dissolved in water at room and high temperatures to have an osmotic pressure and in which precipitation is generated due to low solubility at a low temperature, the crystallization method of separating the draw solution using waste heat of the ship 1 and using sea water as ballast water may also be applied thereto. The first embodiment of the present invention recovers the draw solution using the thermal method from among the above-mentioned various methods.

As described above, the thermal method is a method of recovering a draw solution using a difference between boiling points, and may be used for a draw solution which is decomposed by heat to be easily recovered using distillation. In more detail, the thermal method may include a column distillation method under a condition of a low pressure and an intermediate/low temperature equal to or greater than 40° C., a vacuum distillation method under a condition of an intermediate temperature between 60° C. and 90° C., a membrane distillation method under a condition of an intermediate temperature between 60° C. and 80° C., etc.

The draw solution absorbing water may have, for example, a form of ammonium bicarbonate ($NH_4HCO_3$). The ammonium bicarbonate is separated into ammonia, carbon dioxide, and water ($NH_3+CO_2+H_2O$) by the recovery module 450, and only the water in such a separated state to be supplied to the treatment water tank 500. Subsequently, the draw solution is recovered by replenishing carbon dioxide through the carbon dioxide absorber 490 to be described later.

The membrane used in the forward osmosis membrane module 430 may be a tubular type membrane (having a form of integrating a plurality of separation membranes having a pipe shape in a pressure vessel) or a spiral wound type membrane (having a form of winding a flat membrane and a spacer layer around a tube for collecting permeated water), which is immediately applicable to the current ballast water treatment system. In addition, a hollow fiber type membrane capable of reducing a supply time of ballast water through mass production of treatment water may also be used as the membrane.

Although various application examples of the forward osmosis process unit 400 have been described above, the present invention is not limited thereto.

Meanwhile, the ship 1 includes an economizer 5, and the economizer 5 serves to recover waste heat from combustion gas discharged to the stack 7 from an engine 3 of the ship 1 after combustion of fuel. The recovered waste heat is used for interior heating in the ship 1, heating of living water, or the like, and the recovery module 450 recovers waste heat through the economizer 5 and uses the waste heat to collect the draw solution and separate fresh water therefrom.

The carbon dioxide absorber 490 is additionally provided in a case of using a type of draw solution capable of being collected through absorption of carbon dioxide, and is used to separate fresh water from the draw solution. Since the draw solution separated into ammonia and carbon dioxide may not be recovered when water is separated and then the carbon dioxide is not fully supplied to the draw solution, the carbon dioxide absorber 490 supplies the carbon dioxide from combustion gas to the draw solution so as to recover the draw solution. The draw solution requiring supply of carbon dioxide may representatively include ammonium bicarbonate, ammonium carbonate, etc. as volatile materials.

When the ballast water of the ship is produced using the forward osmosis process as described above, the waste heat and carbon dioxide of the ship may be utilized to thereby reduce energy. In addition, it may be possible to supply the ballast water of the ship and the fresh water required within the ship together.

Hereinafter, a ballast water treatment apparatus for a ship using a forward osmosis process according to other embodiments of the present invention will be described. Here, detailed description of configurations and contents overlapped with those of the first embodiment will be omitted.

Figure 2:
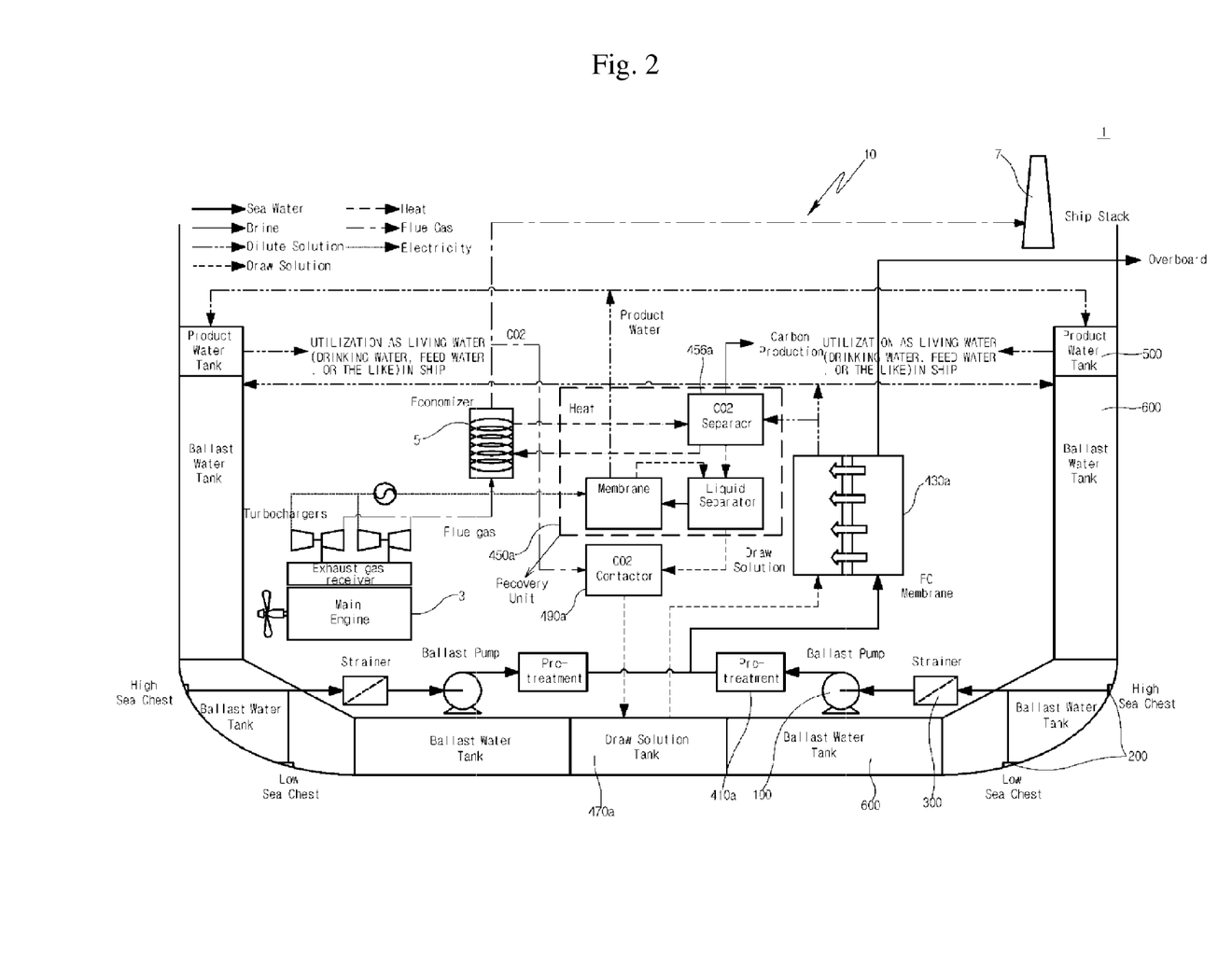
FIG. 2 is a block diagram illustrating a ballast water treatment apparatus for a ship using a forward osmosis process according to a second embodiment of the present invention.

FIG. 2 is a block diagram illustrating a ballast water treatment apparatus for a ship using a forward osmosis process according to a second embodiment of the present invention.

As shown in FIG. 2, a ballast water treatment apparatus 10 for a ship 1 using a forward osmosis process according to a second embodiment of the present invention includes a forward osmosis process unit 400a which includes a pre-treatment part 410a for pre-treating sea water, a forward osmosis membrane module 430a for infiltrating fresh water into a draw solution from sea water, a recovery module 450a for recovering the draw solution and separates the fresh water from a mixture solution of the draw solution and the fresh water, and a draw solution tank 470a for storing the draw solution used in the forward osmosis membrane module 430a.

The recovery module 450a separates the draw solution using a phase separation method. The phase separation method uses a principle in which a draw solution is recovered through oil-water separation since, when an organic solvent having a strong polarity is used as the draw solution, the organic solvent is hydrophilic when carbon dioxide is absorbed by an SPS (Switchable Polarity Solvent) using ionization strength and the organic solvent is hydrophobic under a heating condition of absorbing nitrogen or air. The phase separation method uses a principle in which, when an FA-PEG draw solution is used as the draw solution, the draw solution is separated using a cloud point and separation capability thereof varies according to a concentration (10~90%) in a temperature range between 10° C. and 70° C. The phase separation method uses a principle in which, when a polyoxy random copolymer is used as the draw solution, the draw solution is phase-separated in a temperature range between 75° C. and 95° C. according to a temperature of an oil-water separation device since the draw solution is phase-separated by heat. The carbon dioxide used for phase separation of the draw solution is supplied from combustion gas by a carbon dioxide separator 456a.

The recovery module 450a operated by the above principle includes a liquid phase separator 454a which separates the draw solution from the mixture solution, a carbon dioxide separator 456a which is supplied with carbon dioxide through an economizer 5 to supply the carbon dioxide to the liquid phase separator 454a, and a separation membrane 452a which separates treatment water from the liquid phase separator 454a. The separation membrane 452a separates the draw solution by surplus power supplied from the ship 1, and the fresh water separated from the draw solution is supplied to a treatment water tank 500 to be used as drinking water and living water in the ship 1. A portion of the draw solution used in the forward osmosis membrane module 430a is supplied as ballast water.

The draw solution used here is representatively an SPS (Switchable Polarity Solvent) and may include tetrahydrofuran, MDEA, etc. A carbon dioxide contactor 490a is provided in order to treat the draw solution.

Figure 3:
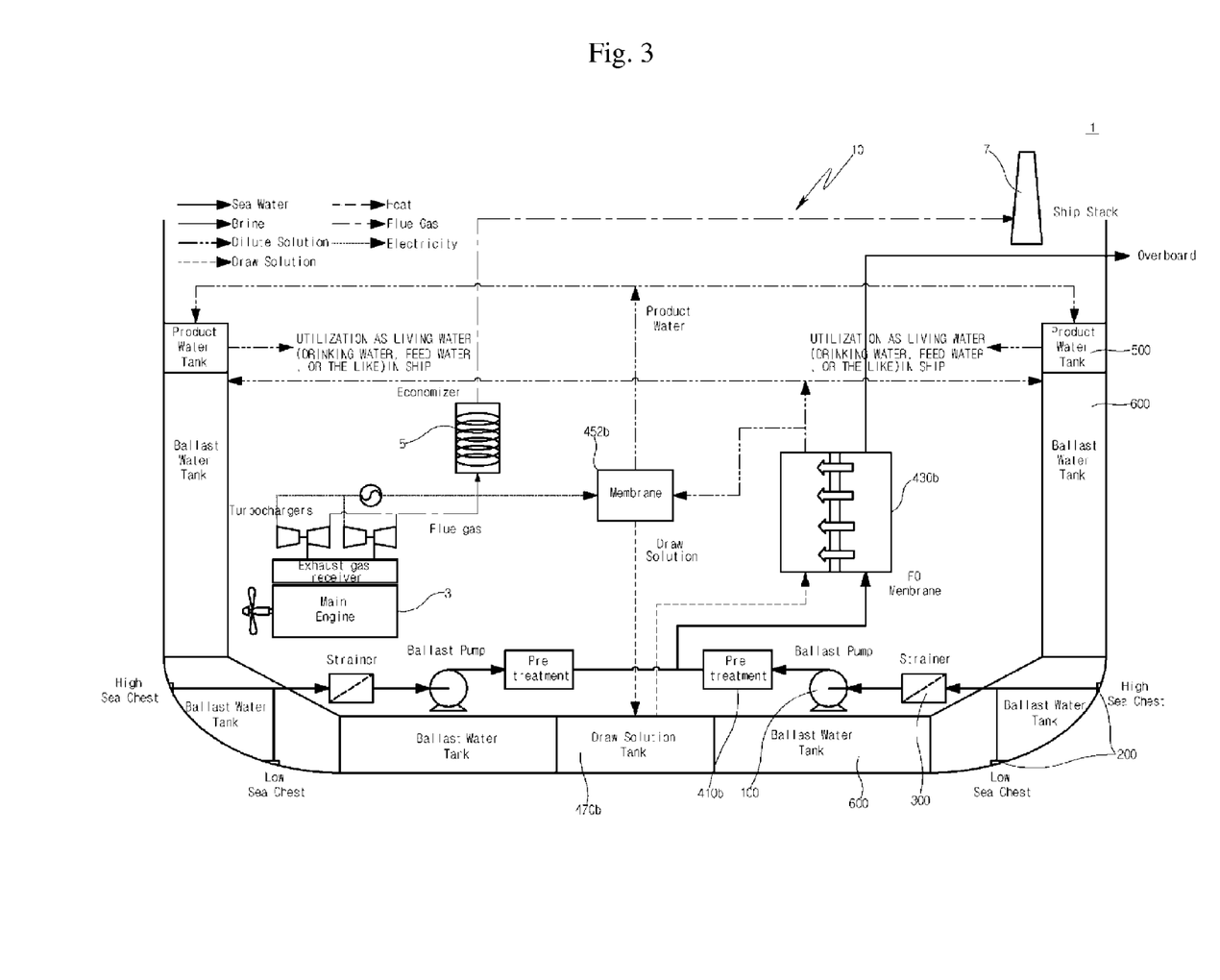
FIG. 3 is a block diagram illustrating a ballast water treatment apparatus for a ship using a forward osmosis process according to a third embodiment of the present invention.

FIG. 3 is a block diagram illustrating a ballast water treatment apparatus for a ship using a forward osmosis process according to a third embodiment of the present invention.

As shown in FIG. 3, a ballast water treatment apparatus 10 for a ship 1 using a forward osmosis process according to a third embodiment of the present invention includes a forward osmosis process unit 400b which includes a pre-treatment part 410b for pre-treating sea water, a forward osmosis membrane module 430b for infiltrating fresh water into a draw solution from sea water, a recovery membrane 452b for recovering the draw solution and separating the fresh water from a mixture solution of the draw solution and the fresh water, and a draw solution tank 470b for storing the draw solution used in the forward osmosis membrane module 430b.

The recovery membrane 452b may be configured of an NF membrane or an RO membrane, and separates a draw solution from the mixture solution of the fresh water and the draw solution used in the forward osmosis process unit 400b by surplus power supplied from the ship 1. The separated draw solution is recovered to the draw solution tank 470b, and the separated fresh water is supplied to a treatment water tank 500 to be used as drinking water and living water in the ship 1. The draw solution recovered through the recovery membrane 452b may include sodium chloride, sodium sulfate, magnesium sulfate, etc. as inorganic materials.

Since such a membrane utilization method requires power for membrane filtration at high pressure when the NF membrane or the RO membrane is used, the draw solution may be recovered by means of using the surplus power of the ship 1.

Figure 4:
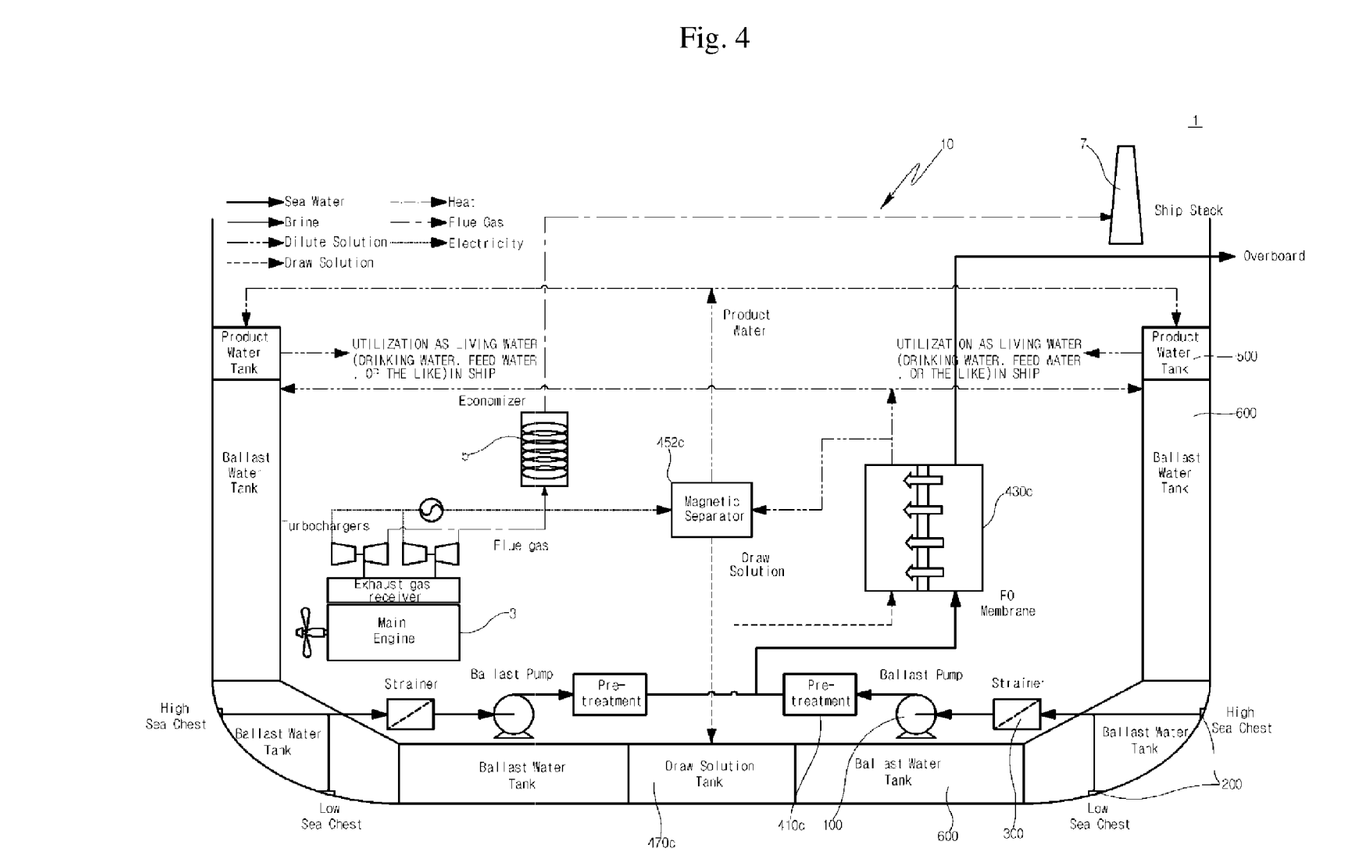
FIG. 4 is a block diagram illustrating a ballast water treatment apparatus for a ship using a forward osmosis process according to a fourth embodiment of the present invention.

FIG. 4 is a block diagram illustrating a ballast water treatment apparatus for a ship using a forward osmosis process according to a fourth embodiment of the present invention.

As shown in FIG. 4, a ballast water treatment apparatus 10 for a ship 1 using a forward osmosis process according to a fourth embodiment of the present invention includes a forward osmosis process unit 400c which includes a pre-treatment part 410c for pre-treating sea water, a forward osmosis membrane module 430c for infiltrating fresh water into a draw solution from sea water, a magnetic separator 452c for recovering the draw solution and separates the fresh water from a mixture solution of the draw solution and the fresh water, and a draw solution tank 470c for storing the draw solution used in the forward osmosis membrane module 430c.

The magnetic separator 452c may separate a draw solution reacting to a magnetic field by surplus power supplied from the ship 1. The draw solution used to this end representatively include aluminum sulfate, PAA, PEG/with MNP, etc.

Such a magnetic utilization method uses a solution, which may form an osmotic pressure and react to the magnetic field, as the draw solution. Accordingly, the draw solution is separated using characteristics simultaneously having the osmotic pressure and magnetism by coating the draw solution with Tris (acetylacetonato) iron (III).

Figure 5:
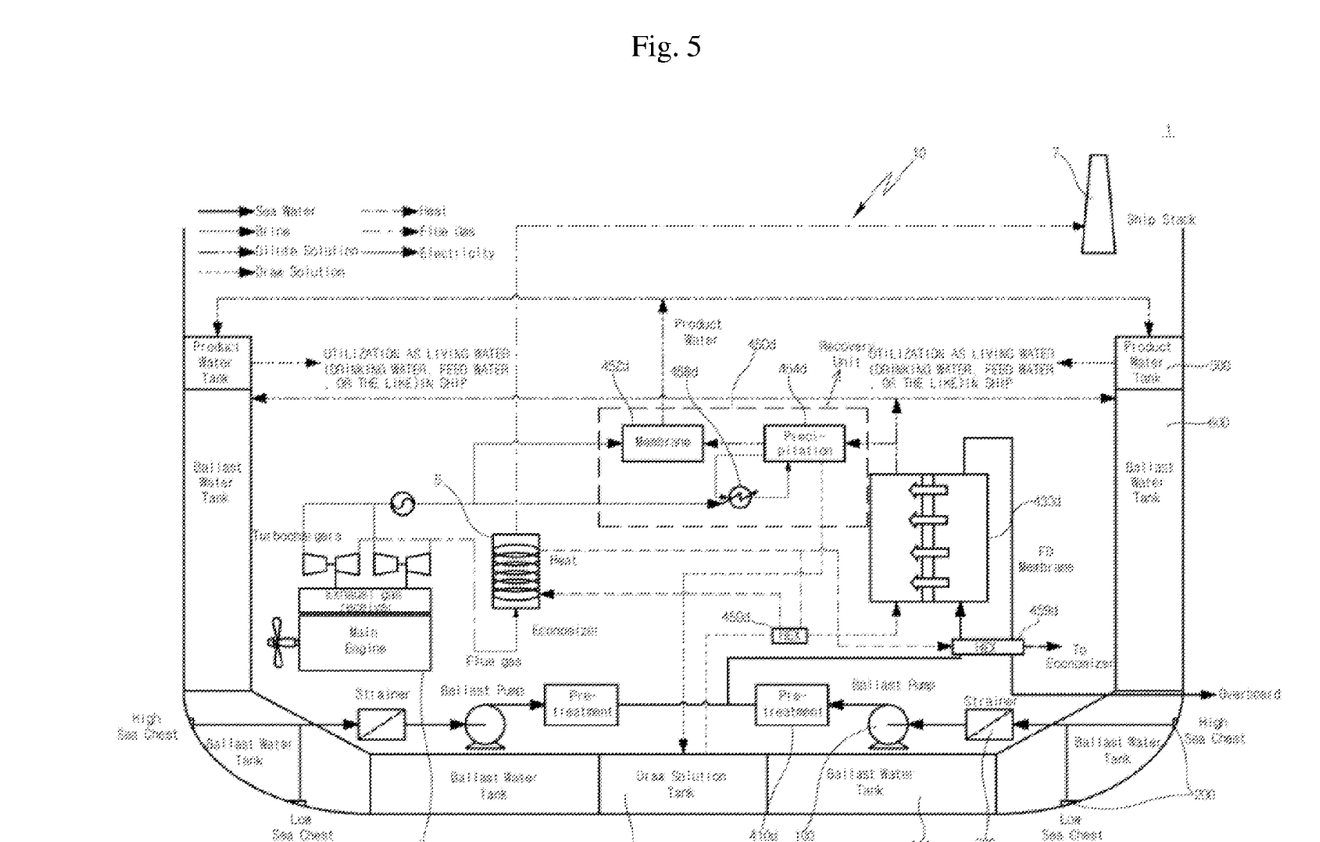
FIG. 5 is a block diagram illustrating a ballast water treatment apparatus for a ship using a forward osmosis process according to a fifth embodiment of the present invention.

FIG. 5 is a block diagram illustrating a ballast water treatment apparatus for a ship using a forward osmosis process according to a fifth embodiment of the present invention.

As shown in FIG. 5, a ballast water treatment apparatus 10 for a ship 1 using a forward osmosis process according to a fifth embodiment of the present invention includes a forward osmosis process unit 400d which includes a pre-treatment part 410d for pre-treating sea water, a forward osmosis membrane module 430d for infiltrating fresh water into a draw solution from sea water, a recovery module 450d for recovering the draw solution and separating the fresh water from a mixture solution of the draw solution and the fresh water, and a draw solution tank 470d for storing the draw solution used in the forward osmosis membrane module 430d.

The recovery module 450d uses a crystallization method of separating a draw solution by cooling and crystallizing the draw solution. In the crystallization method, a draw solution having high solubility at a high temperature or a draw solution having low solubility at a low temperature may be selected if necessary. When the draw solution having high solubility at a high temperature is used in the crystallization method, a recovery amount of the draw solution and productivity of treatment water may be increased, an area of the forward osmosis membrane may be reduced, and capital cost and energy may be reduced. When the draw solution having low solubility at a low temperature is used in the crystallization method, the pressure of a pump and energy consumption may be reduced and capital cost and an area of the reverse osmosis membrane may be reduced. The waste heat of the ship may be utilized when the draw solution having high solubility at a high temperature is used, and the sea water may be utilized as coolant when the draw solution having low solubility at a low temperature is used.

The recovery module 450d which separates the draw solution using the crystallization method includes a cooler 458d for cooling the draw solution, a precipitation tank 454d for precipitating the draw solution and then recovering the draw solution to the draw solution tank 470d, and a separation membrane 452d which separates fresh water except for the precipitated draw solution. The cooler 458d and the separation membrane 452d are operated by surplus power supplied from the ship 1, and the fresh water separated by the separation membrane 452d is supplied to the treatment water tank 500.

The crystallized draw solution recovered to the draw solution tank 470d is dissolved again by a heat exchanger 459d for heating the draw solution using heat recovered from the economizer 5 before being supplied to the forward osmosis membrane module 430d, and is then supplied to the forward osmosis membrane module 430d. More than one heat exchanger 459d may be provided. A first heat exchanger 459d may be used to heat the draw solution, and a second heat exchanger 459″ may be used to heat the pre-treated sea water supplied to the forward osmosis membrane module 430d. When the sea water is heated and used, the temperature of water is increased and the viscosity thereof is decreased, resulting in improvement of membrane permeability. Consequently, production efficiency of the treatment water may be improved. Remaining heat after being used in the first and second heat exchangers 459d and 459″ is recovered again to the economizer 5 and then may be discharged to the outside of the ship 1 through the stack 7 of the ship 1 or be reused.

As is apparent from the above description, since sea water is treated using a forward osmosis process in a ballast water treatment apparatus and method for a ship using a forward osmosis process according to exemplary embodiments of the present invention, fresh water required within a ship can be supplied and the treated sea water can be used as ballast water. In addition, since waste heat and carbon dioxide generated in the ship are used to treat sea water, the ballast water can be treated and produced in a low-cost and high efficient manner.

In addition, since salt water having a higher molecular weight than sea water generated by the forward osmosis process is used as the ballast water, the same effect can be exhibited by a smaller amount than the sea water. Since the treatment water generated by the forward osmosis process is eco-friendly treatment water without chemical components or harmful components, the treatment water can meet more stringent environmental regulations.

While the present invention has been described with respect to the specific embodiments, it will be apparent to those skilled in the art that various changes and modifications may be made without departing from the spirit and scope of the invention as defined in the following claims.

What is claimed is:

1. A ballast water treatment apparatus on a ship, comprising:
   a water collection part for collecting sea water in the ship;
   a forward osmosis process unit configured to produce ballast water and fresh water on a ship that is obtained by desalinating the sea water collected through the water collection part;
   wherein the forward osmosis process unit comprises:
      a pre-treatment part configured to receive the sea water from the water collection part and produce pre-treated water;
      a forward osmosis membrane module configured to receive the pre-treated water and to produce a mixture solution by using a draw solution, and to separate fresh water from the pre-treated sea water through member exchange with the draw solution;
      a recovery module configured to recover the draw solution and separate desalinated treatment water from the mixture solution; and
      a draw solution tank configured to store the draw solution recovered by the recovery module and to supply the draw solution to the forward osmosis membrane module;
   a product water tank on the ship configured to store the fresh water produced by the forward osmosis process unit; and
   a ballast water tank on the ship configured to store the ballast water produced by the forward osmosis process unit, wherein the ballast water produced by the forward osmosis process unit includes a portion of the draw solution of the mixture solution.

2. The ballast water treatment apparatus according to claim 1, further comprising an economizer, wherein the recovery module recovers the draw solution using heat supplied from the economizer for absorbing waste heat of combustion gas discharged from an engine of a ship after combustion so as to supply the draw solution to the draw solution tank, and the separated fresh water is supplied to the product water tank.

3. The ballast water treatment apparatus according to claim 2, wherein the recovery module comprises a carbon dioxide absorber which absorbs carbon dioxide of the combustion gas into the recovered draw solution so that the draw solution absorbing the carbon dioxide is recovered to the draw solution tank.

4. The ballast water treatment apparatus according to claim 1, wherein the recovery module comprises:
- a carbon dioxide separator, wherein the carbon dioxide separator separates carbon dioxide by absorbing waste heat of combustion gas discharged from an engine of a ship after combustion,
- a liquid phase separator, wherein the liquid phase separator separates the draw solution using the separated carbon dioxide, and
- a separation membrane, wherein the separation membrane separates the fresh water from the liquid phase separator.

5. The ballast water treatment apparatus according to claim 4, wherein the recovery module further comprises a carbon dioxide contactor which allows the draw solution separated from the liquid phase separator to come into contact with carbon dioxide of the combustion gas so that the draw solution coming into contact with the carbon dioxide is supplied to the draw solution tank.

6. The ballast water treatment apparatus according to claim 1, wherein the recovery module comprises a separation membrane which separates the draw solution and the fresh water from the mixture solution using surplus power supplied from a ship.

7. The ballast water treatment apparatus according to claim 1, wherein the recovery module comprises a magnetic separator which separates the draw solution and the fresh water from the mixture solution using surplus power supplied from a ship.

8. The ballast water treatment apparatus according to claim 1, wherein the recovery module comprises:
- a cooler operated by surplus power supplied from a ship,
- a precipitation tank for precipitating the draw solution by lowering a temperature of the draw solution through the cooler and supplying the crystallized draw solution to the draw solution tank, and
- further comprises a separation membrane which separates the fresh water from the precipitation tank by the supplied surplus power.

9. The ballast water treatment apparatus according to claim 8, further comprising an economizer, and wherein the recovery module further comprises a first heat exchanger which heats and dissolves the crystallized draw solution supplied to the draw solution tank using heat supplied from the economizer for absorbing waste heat of combustion gas discharged from an engine of the ship after combustion.

10. The ballast water treatment apparatus according to claim 9, wherein the recovery module further comprises a second heat exchanger which heats the pre-treated sea water supplied to the forward osmosis membrane module using the heat supplied from the economizer.

11. The ballast water treatment apparatus according to claim 1, further comprising a filter part for filtering the sea water collected through the water collection part, and a sea water pump for pumping the sea water such that the sea water is collected through the water collection part and supplying the sea water filtered by the filter part to the pre-treatment part.

12. The ballast water treatment apparatus according to claim 1, wherein the draw solution is a material belonging to one of a volatile material group, an inorganic material group, an organic material group, and a synthesis material group.

* * * * *